(12) United States Patent
Chou et al.

(10) Patent No.: US 11,392,531 B2
(45) Date of Patent: Jul. 19, 2022

(54) ROTATABLE PORT UNITS

(71) Applicant: Hewlett-Packard Development Company, L.P., Spring, TX (US)

(72) Inventors: Ming-Fong Chou, Taipei (TW); Chang-Cheng Hsieh, Taipei (TW); Heng-Chang Hsu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/279,624

(22) PCT Filed: Nov. 29, 2018

(86) PCT No.: PCT/US2018/063123
§ 371 (c)(1),
(2) Date: Mar. 25, 2021

(87) PCT Pub. No.: WO2020/112120
PCT Pub. Date: Jun. 4, 2020

(65) Prior Publication Data
US 2021/0390072 A1 Dec. 16, 2021

(51) Int. Cl.
*G06F 13/40* (2006.01)
*G06F 1/16* (2006.01)
*H01R 27/00* (2006.01)

(52) U.S. Cl.
CPC ........ *G06F 13/4081* (2013.01); *G06F 1/1632* (2013.01); *H01R 27/00* (2013.01); *H01R 2201/06* (2013.01)

(58) Field of Classification Search
CPC .......................... G06F 13/4081; G06F 1/1632

USPC ........................................................ 710/303
See application file for complete search history.

(56) References Cited

U.S. PATENT DOCUMENTS

| | | | |
|---|---|---|---|
| 6,290,517 B1 * | 9/2001 | Anderson | G06F 1/1616 439/131 |
| 6,396,687 B1 | 5/2002 | Sun et al. | |
| 7,053,320 B2 | 5/2006 | Kodo et al. | |
| 7,066,767 B2 * | 6/2006 | Liao | H01R 27/02 439/13 |
| 7,170,753 B2 * | 1/2007 | Campini | H05K 7/1448 361/737 |
| 7,200,002 B2 * | 4/2007 | Peng | G06F 1/181 361/679.33 |
| 7,217,144 B1 * | 5/2007 | Cipolla | H01R 13/73 439/10 |

(Continued)

FOREIGN PATENT DOCUMENTS

| | | |
|---|---|---|
| CN | 205793090 U | 12/2016 |
| CN | 107040030 A | 8/2017 |
| EP | 1580966 B1 | 11/2009 |

*Primary Examiner* — Brian T Misiura
(74) *Attorney, Agent, or Firm* — Lakshmi Kumaran & Sridharan

(57) ABSTRACT

Example of systems with rotatable port units are described. In an example, a system includes a control unit, a first port unit with a first set of ports coupled to the control unit, and a second port unit with a second set of ports coupled to the control unit. The second port unit is mounted on the first port unit and is rotatable with respect to the first port unit. The control unit is to enable a sub-set of ports from the second set of ports and the first set of ports based on a rotational position of the second port unit with respect to the first port unit.

12 Claims, 11 Drawing Sheets

(56) References Cited

U.S. PATENT DOCUMENTS

| | | | |
|---|---|---|---|
| 7,374,433 B2* | 5/2008 | Wu | G06F 1/1613 |
| | | | 361/679.55 |
| 7,494,349 B1 | 2/2009 | Huang et al. | |
| 7,540,748 B2* | 6/2009 | Tracy | G06F 1/1616 |
| | | | 439/131 |
| 7,679,901 B2 | 3/2010 | Lin | |
| 7,715,208 B2* | 5/2010 | Campini | G06F 1/185 |
| | | | 361/796 |
| 7,811,102 B2* | 10/2010 | Lai | H01R 27/00 |
| | | | 439/131 |
| 8,693,207 B2* | 4/2014 | Yang | H01R 27/00 |
| | | | 361/755 |
| 9,019,721 B2* | 4/2015 | Chen | H05K 7/1427 |
| | | | 361/810 |
| 9,083,778 B2* | 7/2015 | Kim | G06F 1/1632 |
| 9,436,221 B2* | 9/2016 | Raghunathan | G06F 1/1632 |
| 9,509,104 B2* | 11/2016 | Wong | H01R 13/73 |
| 9,851,751 B2* | 12/2017 | Sugiura | G06F 1/1626 |
| 9,891,666 B2* | 2/2018 | Buss | G04G 19/00 |
| 10,034,398 B2* | 7/2018 | Kurian | G06F 1/1632 |
| 10,193,285 B1* | 1/2019 | Satyanarayanan | H01R 27/02 |
| 2012/0014056 A1 | 1/2012 | Chen et al. | |
| 2013/0005179 A1* | 1/2013 | Aldana | H01R 13/6315 |
| | | | 439/529 |
| 2014/0097793 A1* | 4/2014 | Wurtz | H02J 7/0044 |
| | | | 320/108 |
| 2015/0024625 A1* | 1/2015 | Hsieh | H01R 33/90 |
| | | | 439/540.1 |
| 2021/0173441 A1* | 6/2021 | Tang | G06F 1/1632 |

* cited by examiner

ROTATABLE PORT UNITS

BACKGROUND

Systems, such as docking stations, may include a port unit with multiple interfaces or ports to which various electronic devices can be connected. The electronic devices may include, but are not limited to, mobile phones, portable music players, laptops, tablets, and display devices. Ports in the port unit of a docking station may include, but are not limited to, a universal serial bus (USB) port, a WiFi port, a Bluetooth™ port, a near-field communication (NFC) port, a high-definition multimedia interface (HDMI) port, a wireless charging port, and such.

BRIEF DESCRIPTION OF DRAWINGS

The following detailed description references the drawings, wherein.

DETAILED DESCRIPTION

Figure 1:
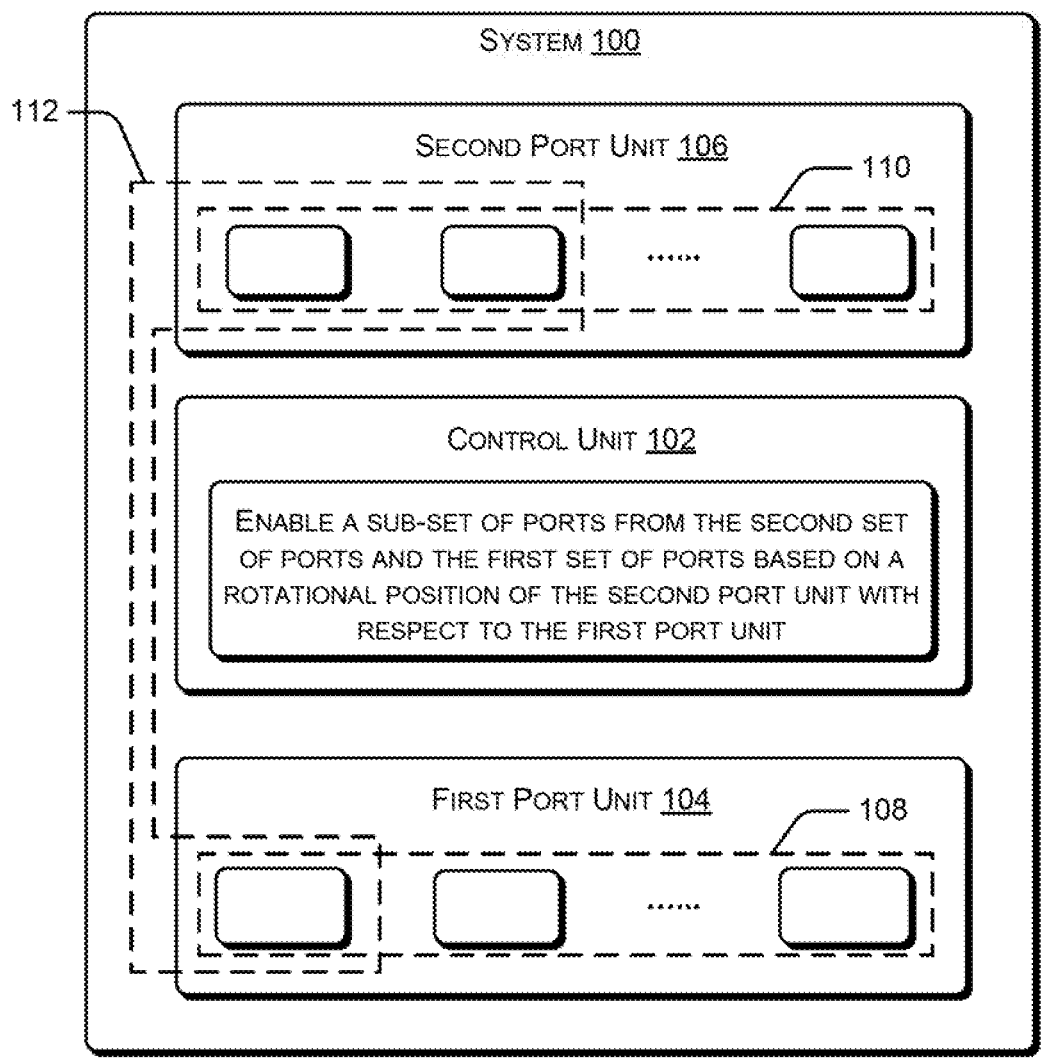
FIG. 1 illustrates a system with two port units, according to an example.

Electronic devices like mobile phones, portable music players, laptops, tablets, and display devices, may be connected to a system, such as a docking station, for the purpose of, for example, charging of the electronic devices, or receiving or transmitting data. The docking station may include ports to allow the electronic devices to connect to the docking station. A port may be a wired interface or a wireless interface to which an electronic device can be connected. Examples of port include, but are not limited to, a universal serial bus (USB) port, a WiFi port, a Bluetooth™ port, a near-field communication (NFC) port, a high-definition multimedia interface (HDMI) port, a video graphics array (VGA) port, and a wireless charging port.

Multi-port systems or docking stations are plug-and-play type systems in which all the ports are either ON or OFF. In such systems, users may not be able to selectively switch ON or OFF a sub-set of ports. Further, multi-port systems may include a combination of wired and wireless ports. A wired port may be a port that allows an electronic device to connect to the multi-port system through a wire or a cable. A wireless port may be a port that allows an electronic device to connect wirelessly to the multi-port system. The wired ports in a multi-port system may be fixedly positioned on one side, for example, a backside of the system to enhance the aesthetics of the multi-port system. A user may find it difficult to access the wired ports at the backside of the multi-port system for connecting an electronic device.

The present subject matter describes systems, for example, multi-port systems with ports configured across two port units. One port unit of a multi-port system may include a first set of ports, and another port unit of the multi-port system may include a second set of ports. A port unit of the multi-port system may be a component having one port, or multiple ports. In accordance with the present subject matter, one of the port units is rotatable with respect to the other port unit. Further, in the multi-port system, a sub-set of ports from the first set of ports and the second set of ports may be enabled based on a rotational position of one port unit with respect to the other port unit. Enabling a port of the multi-port system may refer to activation or switching ON of the port to allow communication between the multi-port system and the electronic device connected to the port. The rotational position of the port unit may refer to a position arrived at by the port unit after sweeping an angle $\theta°$ from a reference position. The reference position may be defined as $0°$ position, and the rotation position may thus be defined as $\theta°$ position. Thus, one sub-set of ports from the first set of ports and the second set of ports may be enabled at $\theta_1°$ position and another sub-set of ports from the first set of ports and the second set of ports may be enabled at $\theta_2°$ position.

The multi-port systems with the two port units, as described herein, allow users to selectively enable a sub-set of ports based on the rotation position of one port unit with respect to the other port unit. Further, a user may rotate a port unit of multi-port system to a position such that a port to which the user has to connect an electronic device faces the user. The rotation of a port unit to bring a port in front facilitates ease of accessibility of ports, thereby enhancing the user experience with the multi-port system.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a system 100 with two port units, according to an example. The system 100, also referred to as a multi-port system, may be a docking station having multiple ports to allow electronic devices (not shown) like mobile phones, portable music players, laptops, tablets, and display devices, to be connected thereto for charging of the electronic devices, or receiving or transmitting data.

As shown in FIG. 1, the system 100 includes a control unit 102, a first port unit 104, and a second port unit 106. The first port unit 104 includes a first set of ports 108 coupled to the control unit 102, and the second port unit includes a second set of ports 110 coupled to the control unit 102. The first set of ports 108 and the second set of ports 110 may include wired ports, wireless ports, or a combination thereof. Examples of a port include, but are not limited to, a USB port, a WiFi port, a Bluetooth™ port, an NFC port, an HDMI port, a wireless charging port, a VGA port, and a local area network (LAN) port.

In an example, the second port unit 106 is mounted, either directly or indirectly, e.g., through intermediary components, on the first port unit 104. The second port unit 106 is mounted on the first port unit 104 such that the second port unit 106 is rotatable with respect to the first port unit 104. The second port unit 106 is rotatable about an axis perpendicular to a plane having the first port unit 104. The second port unit 106 can be manually rotated over the first port unit 104 by a user (not shown) of the system 100.

Further, the control unit 102 of the system 100 enables a sub-set of ports 112 from the second set of ports 110 and the first set of ports 108 based on a rotational position of the second port unit 106 with respect to the first port unit 104. Enabling a port of the system 100 may refer to activation or switching ON of the port. The rotational position of the second port unit 106 may be a position arrived at by the second port unit 106 after sweeping an angle θ° from a 0° reference position. The angle θ° can be between 0° to 360°.

The control unit 102 may be implemented through a combination of any suitable hardware and computer-readable instructions. The control unit 102 may be implemented in a number of different ways to perform various functions for the purposes of enabling port(s) of the system 100 and communication of the system 100 with the electronic devices connected to the system 100. For example, the computer-readable instructions for the control unit 102 may be processor-executable instructions stored in a non-transitory computer-readable storage medium, and the hardware for the control unit 102 may include a processing resource to execute such instructions for enabling port(s) of the system 100 and communication of the system 100 with the electronic devices connected to the system 100. In some examples, the non-transitory computer-readable storage medium may store instructions which, when executed by the processing resource, implement the control unit 102. The processing resource may be implemented as microprocessors, microcomputers, microcontrollers, digital signal processors, central processing units, state machines, logic circuitries, and/or any devices that manipulate signals based on operational instructions. Among other capabilities, the processing resource may fetch and execute computer-readable instructions stored in a non-transitory computer-readable storage medium. The non-transitory computer-readable storage medium may include, for example, volatile memory (e.g., random-access memory (RAM)), and/or non-volatile memory (e.g., erasable programmable read-only memory (EPROM), flash memory, non-volatile random-access memory (NVRAM), memristor, etc.). In an example, the control unit 102 may be implemented by electronic circuitry.

In an example, the control unit 102 may enable a first sub-set of ports from the second set of ports 110 and the first set of ports 108 at a $\theta_1°$ rotational position of the second port unit 106 with respect to the first port unit 104, enable a second sub-set of ports from the second set of ports 110 and the first set of ports 108 at a $\theta_2°$ rotational position of the second port unit 106 with respect to the first port unit 104, enable a third sub-set of ports from the second set of ports 110 and the first set of ports 108 at a $\theta_3°$ rotational position of the second port unit 106 with respect to the first port unit 104, enable a fourth sub-set of ports from the second set of ports 110 and the first set of ports 108 at a $\theta_4°$ rotational position of the second port unit 106 with respect to the first port unit 104, and so on, as the case be. In an example, $\theta_1°$ may be 0°, $\theta_2°$ may be 90°, $\theta_3°$ may be 180°, and $\theta_4°$ may be 270°.

In an example, the second port unit 106 may include a speaker unit (not shown in FIG. 1) coupled to the control unit 102. The control unit 102 may switch ON the speaker unit at the $\theta_1°$ rotational position, the $\theta_2°$ rotational position, the $\theta_3°$ rotational position, or the $\theta_4°$ rotational position of the second port unit 106 with respect to the first port unit 104, such that the speaker unit is enabled along the sub-set of ports enabled at that rotational portion.

The rotational position of the second port unit 106 with respect to the first port unit 104 may be determined and accordingly the sub-set of ports may be enabled by the control unit 102. In an example, the system 100 may include a magnetic sensor unit (not shown in FIG. 1) coupled to the first port unit 104, the second port unit 106, and/or the control unit 102. The control unit 102 detects the rotational position of the second port unit 106 with respect to the first port unit 104 based on measurements by the magnetic sensor unit, and accordingly enables a sub-set of ports.

In another example, the system 100 may include an electrical sensor unit (not shown in FIG. 1) coupled to the first port unit 104, the second port unit 106, and/or the control unit 102. The control unit 102 detects the rotational position of the second port unit 106 with respect to the first port unit 104 based on an output of the electrical sensor unit, and accordingly enables a sub-set of ports.

In an example, the system 100 may include a chargeable battery (not shown in FIG. 1) that can be charged and can supply power to the system 100. In an example, the first port unit 104 may include a power port (not shown in FIG. 1) to connect a power cable to supply power to the system 100 and also charge the rechargeable battery.

Figure 2:
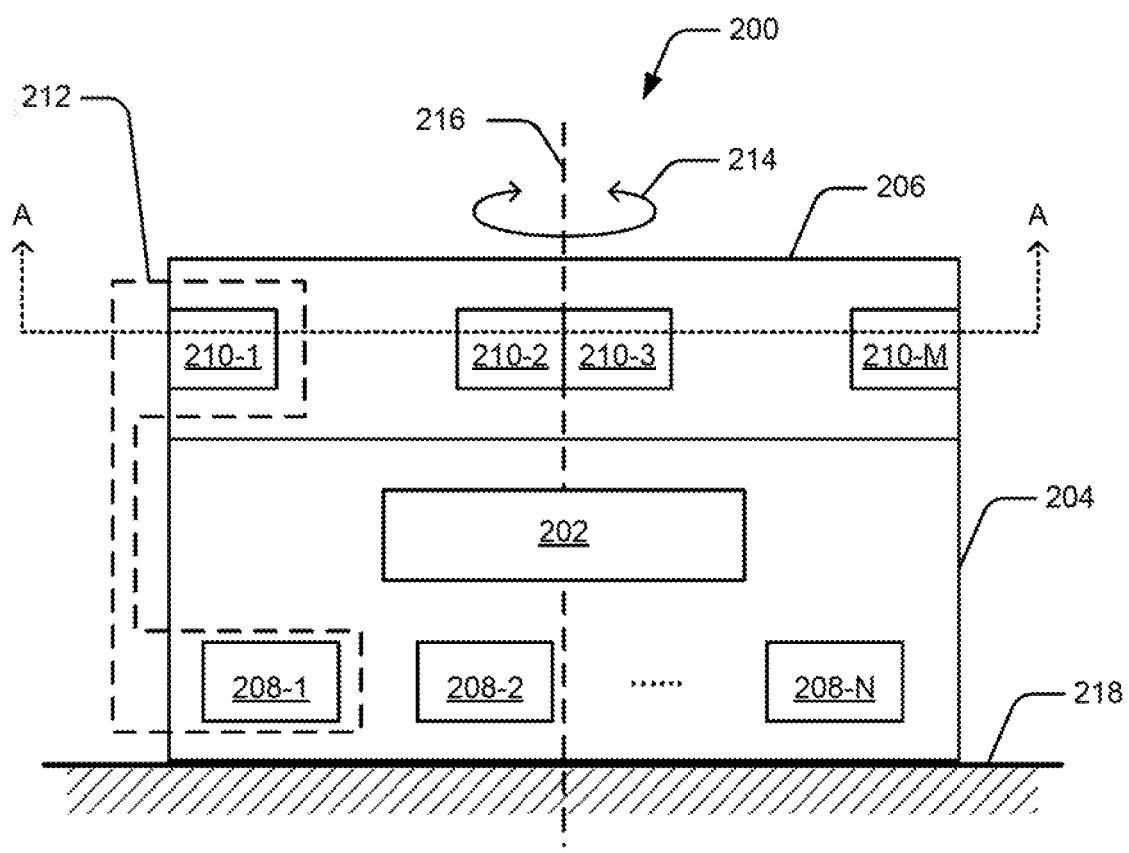
FIG. 2 illustrates a system with two port units, according to an example.

FIG. 2 illustrates a system 200 with two port units, according to an example. The system 200 may be similar to the system 100 of FIG. 1. The system 200 includes multiple ports to allow mobile phones, portable music players, laptops, tablets, and display devices, to be connected thereto for the purpose of charging such devices or receiving or transmitting data.

As shown in FIG. 2, the system 200 includes a control unit 202, a base port unit 204, and a rotating port unit 206. The base port unit 204 may be similar to the first port unit 104 of FIG. 1 and include a first set of ports 208-1, 208-2, . . . 208-N. The rotating port unit 206 may be similar to the second port unit 106 of FIG. 1 and include a second set of ports 210-1, 210-2, . . . 210-M. The first set of ports, collectively referred to as 208, and the second set of ports, collectively referred to as 210, may include wired ports, wireless ports, or a combination thereof. Examples of port include, but are not limited to, a USB port, a WiFi port, a Bluetooth™ port, an NFC port, an HDMI port, a wireless charging port, a VGA port, and a LAN port.

As shown in FIG. 2, the rotating port unit 206 is mounted on the base port unit 204 and is rotatable with respect to the base port unit 204 in a direction 214 about an axis 216 perpendicular to a plane 218 having the base port unit 204, or on which the base port unit 204 is supported. The rotating port unit 206 can be manually rotated over the base port unit 204 by a user of the system 200.

The control unit 202 may be similar to the control unit 102. The control unit 202 is coupled to the first set of ports 208 and the second set of ports 210. The control unit 202 determines the rotational position of the rotating port unit 206 with respect to the base port unit 204 and enables a sub-set of ports 212 from the first set of ports 208 and the second set of ports 210 based on the determination of the rotational position.

In an example, the rotating port unit 206 may be rotatable with respect to the base port unit 204 to a rotational position from amongst a 0° rotational position, a 90° rotational position, a 180° rotational position, and a 270° rotational position. In said example, the control unit 202 may enable a first sub-set of ports from the first set of ports 208 and the second set of ports 210 based on the determination of the 0° rotational position of the rotating port unit 206 with respect to the base port unit 204, enable a second sub-set of ports from the first set of ports 208 and the second set of ports 210 based on the determination of the 90° rotational position of the rotating port unit 206 with respect to the base port unit 204, enable a third sub-set of ports from the first set of ports 208 and the second set of ports 210 based on the determination of the 180° rotational position of the rotating port unit 206 with respect to the base port unit 204, and enable a fourth sub-set of ports from the first set of ports 208 and the second set of ports 210 based on the determination of the 270° rotational position of the rotating port unit 206 with respect to the base port unit 204. Although the describe here is described for four rotational positions of the rotating port unit 206, in an example, the rotating port unit of the system may be rotatable to other rotational positions. Also, although the control unit 202 is shown to be residing in the base port unit 204, in an example, the control unit 202 may reside in the rotating port unit 206.

In an example, the first sub-set of ports enabled at the 0° rotational position of the rotating port unit 206 with respect to the base port unit 204 may include the WiFi port of the rotating port unit 206 and the HDMI port of the base port unit 204. In an example, the second sub-set of ports enabled at the 90° rotational position of the rotating port unit 206 with respect to the base port unit 204 may include the USB port of the rotating port unit 206 and the USB port of the base port unit 204. In an example, the third sub-set of ports enabled at the 180° rotational position of the rotating port unit 206 with respect to the base port unit 204 may include the WiFi port and the Bluetooth™ port of the rotating port unit 206 and the USB port of the base port unit 204. In an example, the fourth sub-set of ports enabled at the 0° rotational position of the rotating port unit 206 with respect to the base port unit 204 may include the wireless charging port of the rotating port unit 206 and the USB port of the base port unit 204.

Further, the base port unit 204 may have the same shape as that of the rotating port unit 206, such that the rotating port unit 206 at any of the rotational positions aligns over the base port unit 204. In an example, the base port unit 204 and the rotating port unit 206 may have a cuboidal shape with a square or rectangular cross-section about axis A-A shown in FIG. 2. In another example, the base port unit 204 and the rotating port unit 206 may have a cylindrical shape with a circular cross-section about axis A-A shown in FIG. 2. In other examples, other shapes and cross-sectional geometries are contemplated.

Figure 3A:
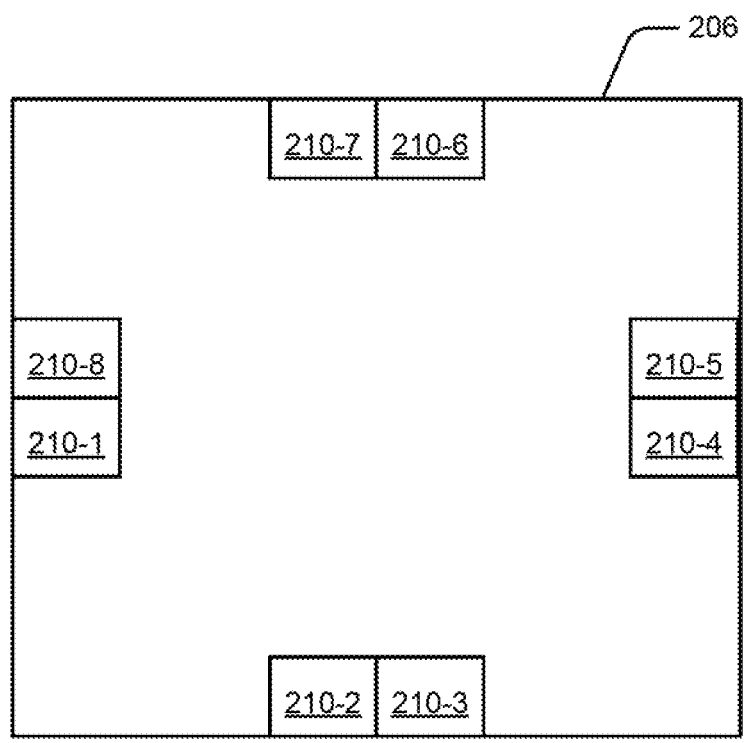
FIGS. 3A to 3D illustrate sectional views of the example system of FIG. 2 with a cross-section about axis A-A at different rotational positions of the rotating port unit with respect to the base port unit.
Figure 3B:
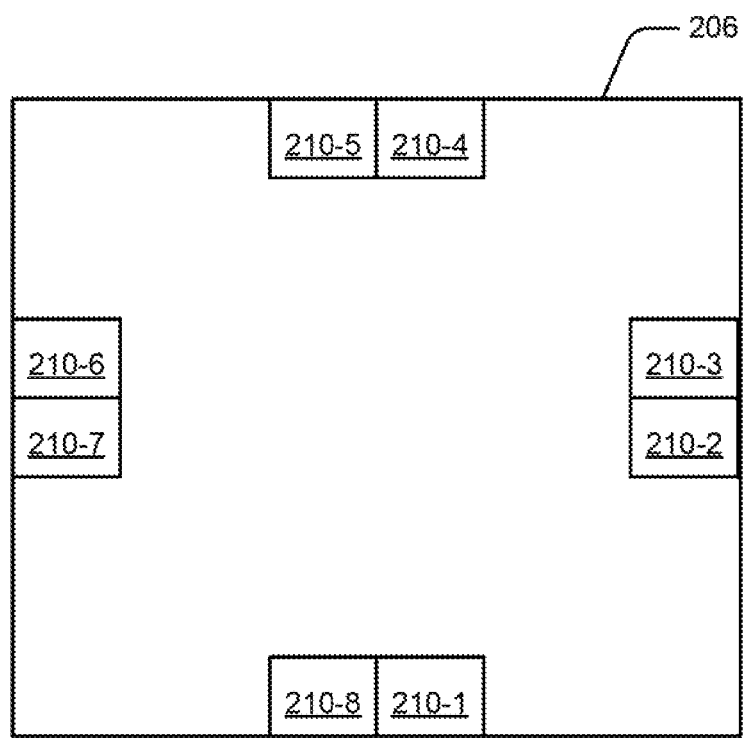
Figure 3C:
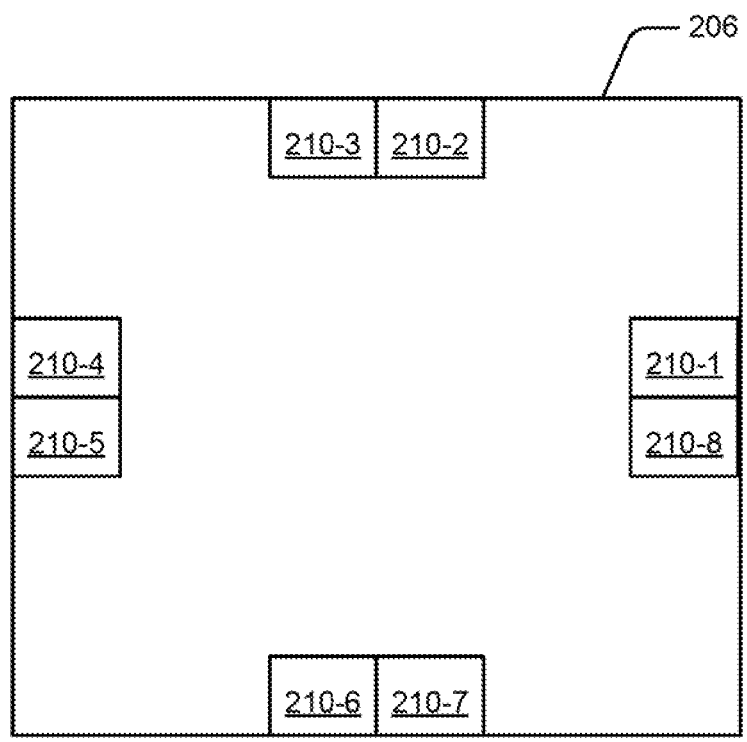
Figure 3D:
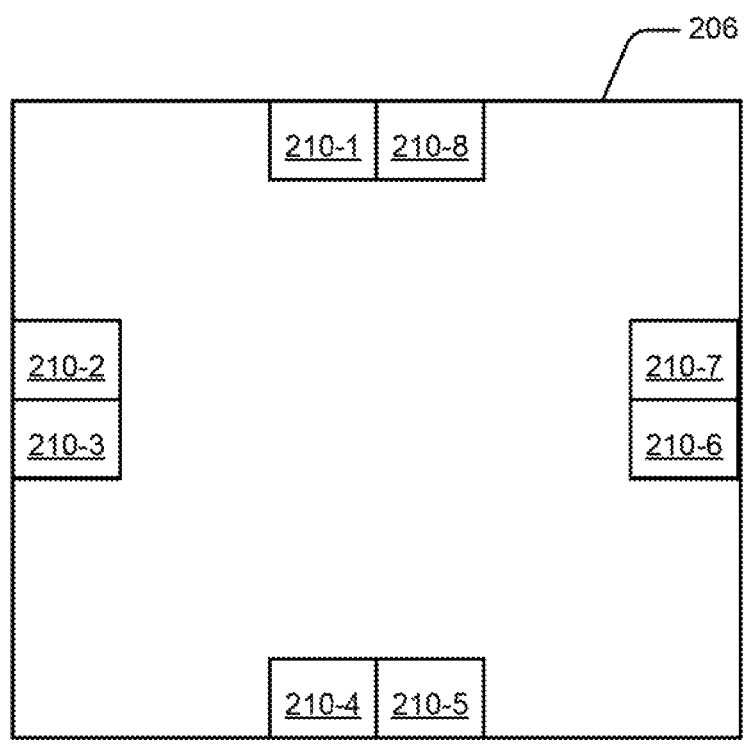

FIGS. 3A to 3D illustrate sectional views of the example system 200 of FIG. 2 with a cross-section about axis A-A at different rotational positions of the rotating port unit 206 with respect to the base port unit 204. As shown in FIGS. 3A to 3D, the rotating port unit 206 includes eight ports, 210-1 to 210-8. FIG. 3A shows the system 200 at the 0° rotational position of the rotating port unit 206 with respect to the base port unit 204. At the 0° rotational position, the control unit 202 may enable port 208-1 from the first set of ports 208 of the base port unit 204 (not visible in FIG. 3A) and enable ports 210-2 and 210-3 from the second set of ports 210 of the rotating port unit 206. FIG. 3B shows the system 200 at the 90° rotational position of the rotating port unit 206 with respect to the base port unit 204. At the 90° rotational position, the control unit 202 may enable port 208-2 from the first set of ports 208 of the base port unit 204 (not visible in FIG. 3B) and enable ports 210-1 and 210-8 from the second set of ports 210 of the rotating port unit 206. Further, FIG. 3C shows the system 200 at the 180° rotational position of the rotating port unit 206 with respect to the base port unit 204. At the 180° rotational position, the control unit 202 may enable port 208-3 from the first set of ports 208 of the base port unit 204 (not visible in FIG. 3C) and enable ports 210-7 and 210-6 from the second set of ports 210 of the rotating port unit 206. Further, FIG. 3D shows the system 200 at the 270° rotational position of the rotating port unit 206 with respect to the base port unit 204. At the 270° rotational position, the control unit 202 may enable port 208-4 from the first set of ports 208 of the base port unit 204 (not visible in FIG. 3D) and enable ports 210-5 and 210-4 from the second set of ports 210 of the rotating port unit 206.

Figure 4A:
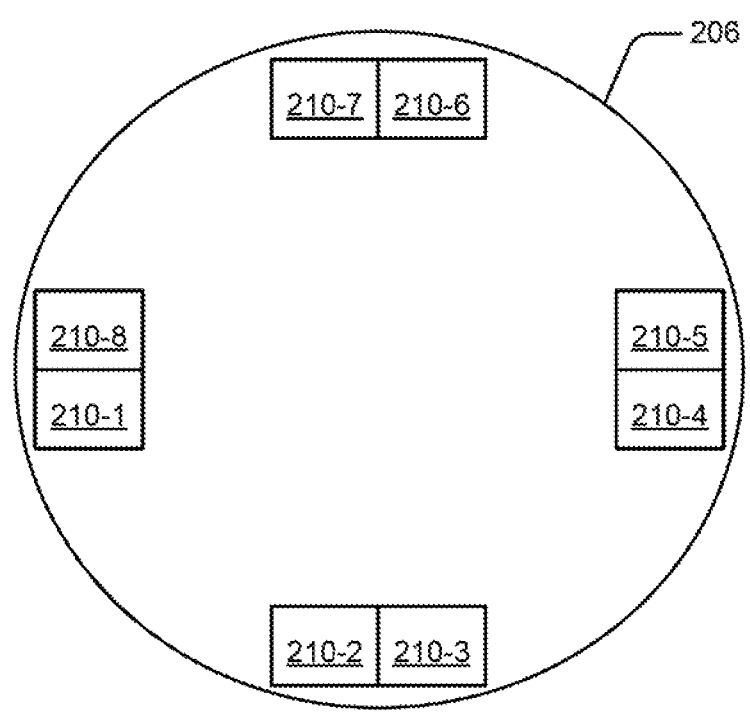
FIGS. 4A to 4D illustrate sectional views of the example system of FIG. 2 with a cross-section about axis A-A at different rotational positions of the rotating port unit with respect to the base port unit.
Figure 4B:
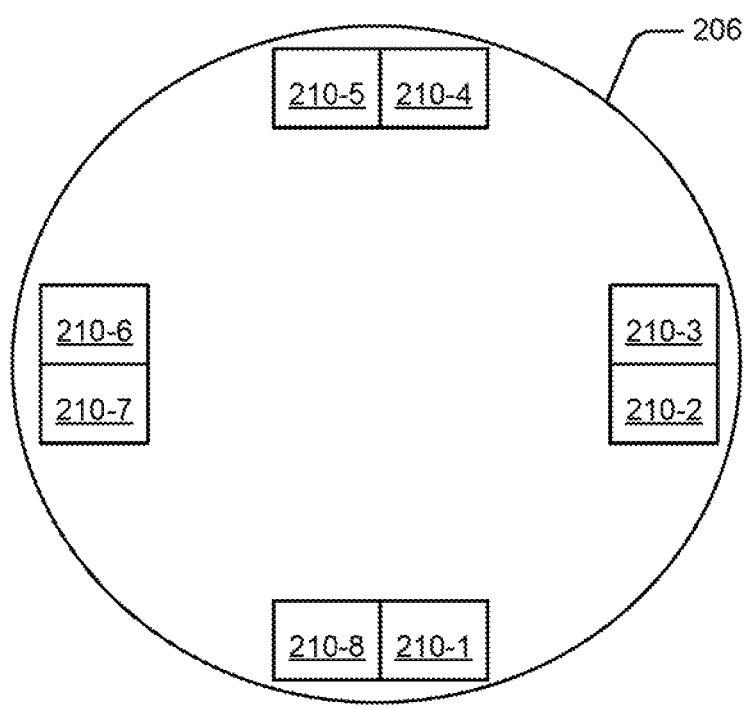
Figure 4C:
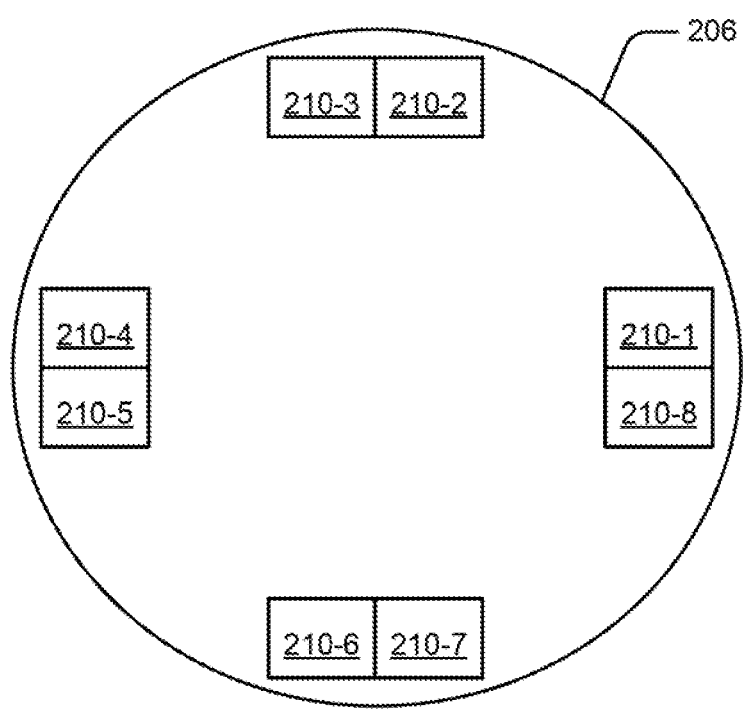
Figure 4D:
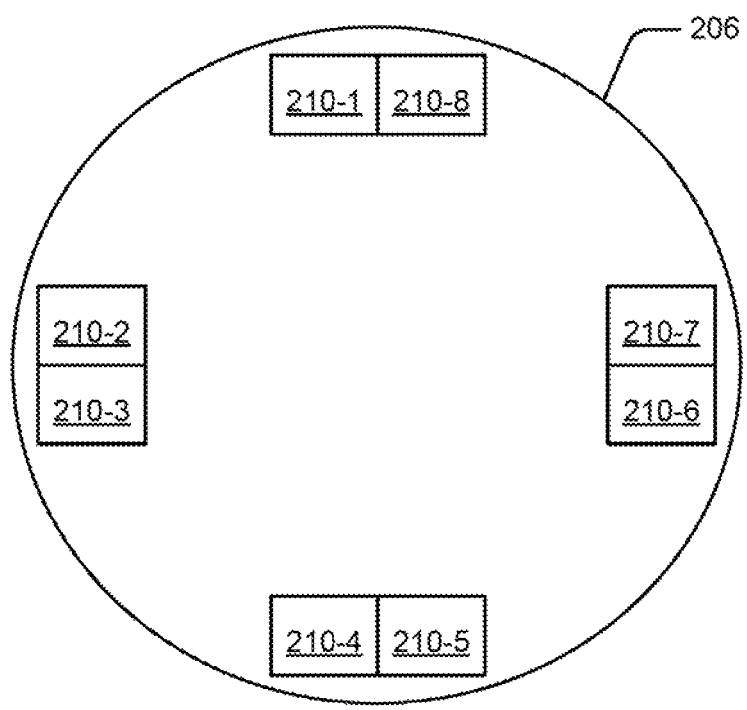

FIGS. 4A to 4D illustrate sectional views of the example system 200 of FIG. 2 with a cross-section about axis A-A at different rotational positions of the rotating port unit 206 with respect to the base port unit 204. As shown in FIGS. 4A to 4D, the rotating port unit 206 includes eight ports, 210-1 to 210-8. FIG. 4A shows the system 200 at the 0° rotational position of the rotating port unit 206 with respect to the base port unit 204, at which the control unit 202 may enable port 208-1 from the first set of ports 208 of the base port unit 204 (not visible in FIG. 4A) and enable ports 210-2 and 210-3 from the second set of ports 210 of the rotating port unit 206. FIG. 3B shows the system 200 at the 90° rotational position of the rotating port unit 206 with respect to the base port unit 204, at which the control unit 202 may enable port 208-2 from the first set of ports 208 of the base port unit 204 (not visible in FIG. 4B) and enable ports 210-1 and 210-8 from the second set of ports 210 of the rotating port unit 206. Further, FIG. 3C shows the system 200 at the 180° rotational position of the rotating port unit 206 with respect to the base port unit 204, at which the control unit 202 may enable port 208-3 from the first set of ports 208 of the base port unit 204 (not visible in FIG. 4C) and enable ports 210-7 and 210-6 from the second set of ports 210 of the rotating port unit 206. Further, FIG. 3D shows the system 200 at the 270° rotational position of the rotating port unit 206 with respect to the base port unit 204, at which the control unit 202 may enable port 208-4 from the first set of ports 208 of the base port unit 204 (not visible in FIG. 4D) and enable ports 210-5 and 210-4 from the second set of ports 210 of the rotating port unit 206. Although system 200 with the circular cross-section along axis A-A is shown to have different sub-sets of ports enabled at 0°, 90°, 180° and 270° rotational positions, in an example, such a system 200 may be implemented to have different sub-sets of ports enabled at other rotational positions, for example, 45°, 135°, 225° and 315° rotational positions.

Returning to FIG. 2, a user may be able to define a different sub-set of ports for being enabled at each of the rotational positions of the rotating port unit 206 with respect to the base port unit 204. The rotational positions of the rotating port unit 206 over the base port unit 204 may, for example, be 0°, 90°, 180°, and 270°, and are predefined. The control unit 202 may receive a first user input to associate a first sub-set of ports from the first set of ports 208 and the second set of ports 210 with a 0° rotational position of the rotating port unit 206 with respect to the base port unit 204, receive a second user input to associate a second sub-set of ports from the first set of ports 208 and the second set of ports 210 with a 90° rotational position of the rotating port unit 206 with respect to the base port unit 204, receive a third user input to associate a third sub-set of ports from the first set of ports 208 and the second set of ports 210 with a 180° rotational position of the rotating port unit 206 with respect to the base port unit 204, and receive a fourth user input to associate a fourth sub-set of ports from the first set of ports 208 and the second set of ports 210 with a 270° rotational position of the rotating port unit 206 with respect to the base port unit 204. Accordingly, the control unit 202 enable the first sub-set of ports based on the determination of the 0° rotational position of the rotating port unit 206 with respect to the base port unit 204, enable the second sub-set of ports based on the determination of the 90° rotational position of the rotating port unit 206 with respect to the base port unit 204, enable the third sub-set of ports based on the determination of the 180° rotational position of the rotating port unit 206 with respect to the base port unit 204, and enable the fourth sub-set of ports based on the determination of the 270° rotational position of the rotating port unit 206 with respect to the base port unit 204.

In an example, the rotating port unit 206 may include a speaker unit (not shown in FIG. 2) coupled to the control unit 202. The control unit 202 may switch ON the speaker unit at the 0° rotational position, or the 90° rotational position, or the 180° rotational position, or the 270° rotational position of the rotating port unit 206 with respect to the base port unit 204, such that the speaker unit is enabled along the sub-set of ports enabled at that rotational portion.

Figure 5:
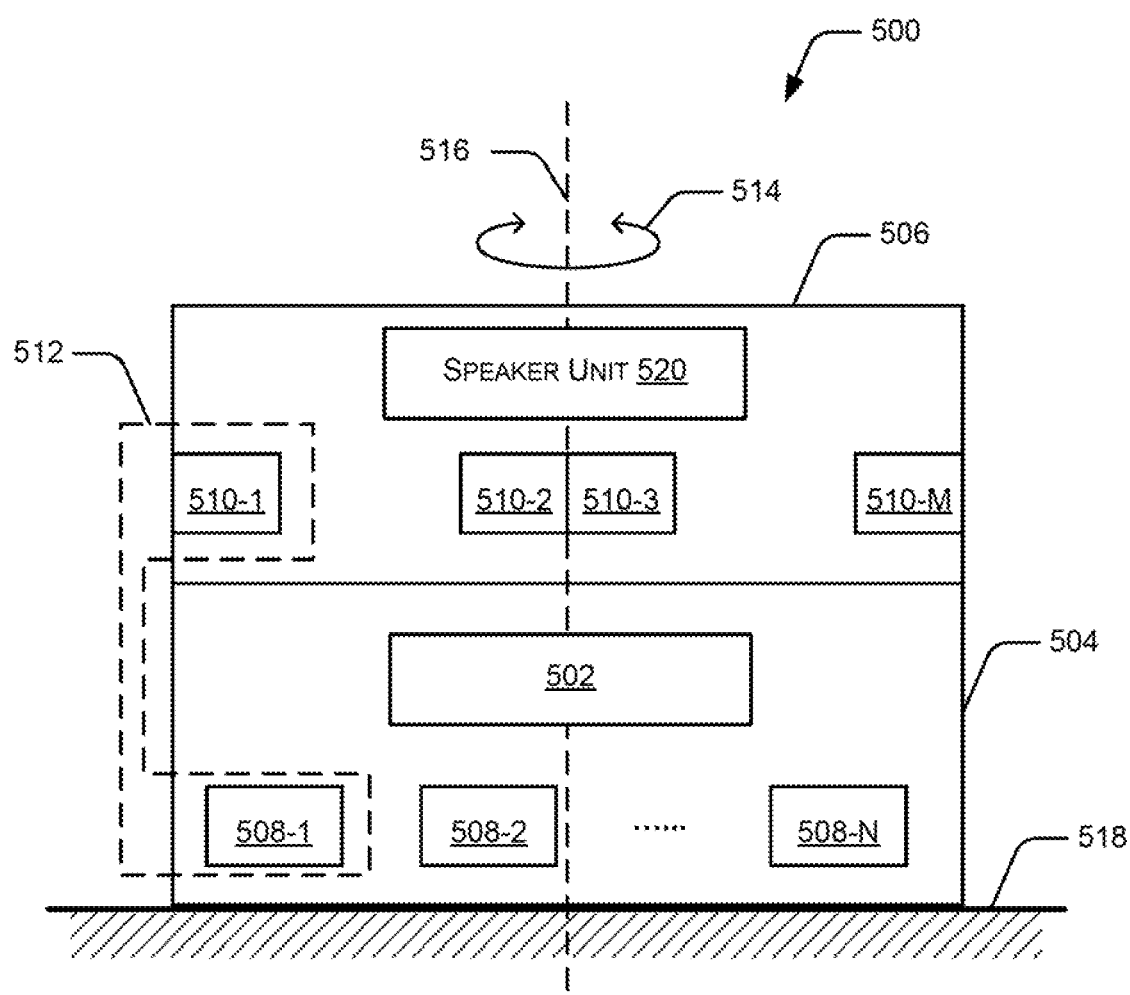
FIG. 5 illustrates a system with two port units, according to an example.

FIG. 5 illustrates a system 500 with two port units, according to an example. The system 500 may be similar to the system 100 or 200. The system 500 includes multiple ports to allow mobile phones, portable music players, laptops, tablets, and display devices, to be connected thereto for the purpose of charging such devices or receiving or transmitting data.

As shown in FIG. 5, the system 500 includes a control unit 502, a base port unit 504, and a rotating port unit 506. The base port unit 504 may be similar to the first port unit 104 or the base port unit 204 and include a first set of ports 508-1, 508-2, . . . 508-N. The rotating port unit 506 may be similar to the second port unit 106 or the rotating port unit 206 and include a second set of ports 510-1, 510-2, . . . 510-M. The first set of ports, collectively referred to as 508, and the second set of ports, collectively referred to as 510, may include wired ports, wireless ports, or a combination thereof. Examples of a port include, but are not limited to, a USB port, a WiFi port, a Bluetooth™ port, an NFC port, an HDMI port, a wireless charging port, a VGA port, and a LAN port. As shown in FIG. 5, the rotating port unit 506 also includes a speaker unit 520.

The rotating port unit 506 is mounted on the base port unit 504 and is rotatable with respect to the base port unit 504 in a direction 514 about an axis 516 perpendicular to a plane 518 having the base port unit 504. The control unit 502 is coupled to the first set of ports 508, the second set of ports 510, and the speaker unit 520. The control unit 202 determines the rotational position of the rotating port unit 506 with respect to the base port unit 504 and enables the speaker unit 520 and a sub-set of ports 512 from the first set of ports 508 and the second set of ports 510 based on the determination of the rotational position.

The control unit 502 may be similar to the control unit 102 or 202. The rotating port unit 506 may be rotatable over the base port unit 504 to 0° rotational position, 90° rotational position, 180° rotational position, and 270° rotational position. The control unit 502 may receive a first user input to associate a first sub-set of ports from the first set of ports 508 and the second set of ports 510 with a 0° rotational position of the rotating port unit 506 with respect to the base port unit 504, receive a second user input to associate a second sub-set of ports from the first set of ports 508 and the second set of ports 510 with a 90° rotational position of the rotating port unit 506 with respect to the base port unit 504, receive a third user input to associate a third sub-set of ports from the first set of ports 508 and the second set of ports 510 with a 180° rotational position of the rotating port unit 506 with respect to the base port unit 504, and receive a fourth user input to associate a fourth sub-set of ports from the first set of ports 508 and the second set of ports 210 with a 270° rotational position of the rotating port unit 506 with respect to the base port unit 504.

Accordingly, the control unit 502 enables the first sub-set of ports based on the determination of the 0° rotational position of the rotating port unit 506 with respect to the base port unit 504, enables the second sub-set of ports based on the determination of the 90° rotational position of the rotating port unit 506 with respect to the base port unit 504, enables the third sub-set of ports based on the determination of the 180° rotational position of the rotating port unit 506 with respect to the base port unit 504, and enables the fourth sub-set of ports based on the determination of the 270° rotational position of the rotating port unit 506 with respect to the base port unit 504.

Further, the control unit 502 may switch ON the speaker unit 520 at the 0° rotational position, or the 90° rotational position, or the 180° rotational position, or the 270° rotational position of the rotating port unit 506 with respect to the base port unit 504, such that the speaker unit 520 is enabled along the sub-set of ports enabled at that rotational portion.

Further, the system 500 may include a magnetic sensor unit (not shown in FIG. 5) coupled to the base port unit 504, the rotating port unit 506, and the control unit 502. The control unit 502 may detect the rotational position of the rotating port unit 506 with respect to the base port unit 504 based on measurements by the magnetic sensor unit and may accordingly enable a sub-set of ports. In an example, the magnetic sensor unit may include a plurality of Hall sensors in the base port unit 504 and include a magnet in the rotating port unit 506. The control unit 502 is coupled to each of the plurality of Hall sensors. The plurality of Hall sensors is positioned in the rotating port unit 506 with one each at each of the rotational positions defined for enabling a different sub-set of ports by the control unit 502. The magnet is positioned in the base port unit 504 such that the magnet overlaps one Hall sensor at each of the respective rotational positions. The control unit 502 may thus determine the rotational position of the rotating port unit 506 with respect to the base port unit 504 depending on the Hall sensor that shows a maximum output voltage due to the overlap of the magnet.

The system 500 may include an electrical sensor unit (not shown in FIG. 5) coupled to the base port unit 504, the rotating port unit 506, and the control unit 502. The control unit 502 may detect the rotational position of the rotating port unit 506 with respect to the base port unit 504 based on an output of the electrical sensor unit and may accordingly enable a sub-set of ports of the system 500. In an example, the electrical sensor unit may include a plurality of general-purpose input/output (GPIO) units, each with a pull-up resistor, in the base port unit 504 and include a GPIO unit with a pull-down resistor in the rotating port unit 506. The control unit 502 is coupled to each of the plurality of GPIO units in the base port unit 504. The plurality of GPIO units with the pull-up resistor is positioned in the rotating port unit 506 with one each at each of the rotational positions defined for enabling a different sub-set of ports by the control unit 502. The GPIO unit with the pull-down resistor is positioned in the base port unit 504 such that the GPIO unit with the pull-down resistor overlaps one GPIO unit with the pull-up resistor at each of the respective rotational positions. The control unit 502 may thus determine the rotational position of the rotating port unit 506 with respect to the base port unit 504 depending on the GPIO unit with the pull-up resistor for which a change of voltage is maximum due to the overlap of the GPIO unit with the pull-down resistor.

Although examples for the present disclosure have been described in language specific to structural features, it is to be understood that the appended claims are not limited to the specific features described herein. Rather, the specific features are disclosed and explained as examples of the present disclosure.

We claim:

1. A system comprising:
   a control unit;
   a first port unit with a first set of ports coupled to the control unit; and
   a second port unit with a second set of ports coupled to the control unit, the second port unit being mounted on the first port unit and rotatable with respect to the first port unit, and wherein the control unit is to enable a sub-set of ports from the second set of ports and the first set of ports based on a rotational position of the second port unit with respect to the first port unit; and
   an electrical sensor unit coupled to the first port unit, the second port unit, and the control unit, wherein the control unit is to detect the rotational position of the second port unit with respect to the first port unit based on an output of the electrical sensor unit.

2. The system as claimed in claim 1, wherein the second port unit is rotatable about an axis perpendicular to a plane having the first port unit.

3. The system as claimed in claim 1, wherein the control unit is to:
   enable a first sub-set of ports from the second set of ports and the first set of ports at a 0° rotational position of the second port unit with respect to the first port unit;
   enable a second sub-set of ports from the second set of ports and the first set of ports at a 90° rotational position of the second port unit with respect to the first port unit;
   enable a third sub-set of ports from the second set of ports and the first set of ports at a 180° rotational position of the second port unit with respect to the first port unit; and
   enable a fourth sub-set of ports from the second set of ports and the first set of ports at a 270° rotational position of the second port unit with respect to the first port unit.

4. The system as claimed in claim 3, wherein the second port unit comprises:
   a speaker unit coupled to the control unit, the control unit is to switch ON the speaker unit at one of the 0° rotational position, the 90° rotational position, the 180° rotational position, and the 270° rotational position of the second port unit with respect to the first port unit.

5. A system comprising:
   a base port unit with a first set of ports;
   a rotating port unit with a second set of ports, the rotating port unit being mounted on the base port unit and rotatable with respect to the base port unit about an axis perpendicular to a plane having the base port unit;
   an electrical sensor unit coupled to the base port unit, the rotating port unit, and a control unit; and
   the control unit coupled to the first set of ports and the second set of ports, wherein the control unit is to:
      determine a rotational position of the rotating port unit with respect to the base port unit based on an output from the electrical sensor unit; and
      enable a sub-set of ports from the first set of ports and the second set of ports based on the determination of the rotational position of the rotating port unit.

6. The system as claimed in claim 5, wherein the control unit is to:
   receive a first user input to associate a first sub-set of ports from the first set of ports and the second set of ports with a 0° rotational position of the rotating port unit with respect to the base port unit;
   receive a second user input to associate a second sub-set of ports from the first set of ports and the second set of ports with a 90° rotational position of the rotating port unit with respect to the base port unit;
   receive a third user input to associate a third sub-set of ports from the first set of ports and the second set of ports with a 180° rotational position of the rotating port unit with respect to the base port unit; and
   receive a fourth user input to associate a fourth sub-set of ports from the first set of ports and the second set of ports with a 270° rotational position of the rotating port unit with respect to the base port unit.

7. The system as claimed in claim 6, wherein the control unit is to:
   enable the first sub-set of ports based on the determination of the 0° rotational position of the rotating port unit with respect to the base port unit;
   enable the second sub-set of ports based on the determination of the 90° rotational position of the rotating port unit with respect to the base port unit;
   enable the third sub-set of ports based on the determination of the 180° rotational position of the rotating port unit with respect to the base port unit; and
   enable the fourth sub-set of ports based on the determination of the 270° rotational position of the rotating port unit with respect to the base port unit.

8. The system as claimed in claim 7, wherein the rotating port unit comprises: a speaker unit coupled to the control unit, wherein the control unit is to switch ON the speaker unit at one of the 0° rotational position, the 90° rotational position, the 180° rotational position, and the 270° rotational position of the rotating port unit with respect to the base port unit.

9. A system comprising:
   a base port unit with a first set of ports;
   a rotating port unit mounted on the base port unit and rotatable with respect to the base port unit about an axis perpendicular to a plane having the base port unit, the rotating port unit including:
      a second set of ports; and
      a speaker unit; and
   a magnetic sensor unit coupled to the base port unit, the rotating port unit, and a control unit:
   the control unit coupled to the first set of ports, the second set of ports, and the speaker unit, wherein the control unit is to:
      determine a rotational position of the rotating port unit with respect to the base port unit based on a measurement by the magnetic sensor unit; and
      enable the speaker unit and a sub-set of ports from the first set of ports and the second set of ports based on the determination of the rotational position of the rotating port unit.

10. The system as claimed in claim 9, wherein the control unit is to:
    receive a first user input to associate a first sub-set of ports from the first set of ports and the second set of ports with a 0° rotational position of the rotating port unit with respect to the base port unit;
    receive a second user input to associate a second sub-set of ports from the first set of ports and the second set of ports with a 90° rotational position of the rotating port unit with respect to the base port unit;
    receive a third user input to associate a third sub-set of ports from the first set of ports and the second set of ports with a 180° rotational position of the rotating port unit with respect to the base port unit; and receive a fourth user input to associate a fourth sub-set of ports from the first set of ports and the second set of ports with a 270° rotational position of the rotating port unit with respect to the base port unit.

11. The system as claimed in claim 10, wherein the control unit is to:

enable the first sub-set of ports based on the determination of the 0° rotational position of the rotating port unit with respect to the base port unit;

enable the second sub-set of ports based on the determination of the 90° rotational position of the rotating port unit with respect to the base port unit;

enable the third sub-set of ports based on the determination of the 180° rotational position of the rotating port unit with respect to the base port unit; and enable the fourth sub-set of ports based on the determination of the 270° rotational position of the rotating port unit with respect to the base port unit.

12. The system as claimed in claim 10, wherein the control unit is to switch ON the speaker unit based on the determination of one of the 0° rotational position, the 90° rotational position, the 180° rotational position, and the 270° rotational position of the rotating port unit with respect to the base port unit.

* * * * *